Figures 1, 2:
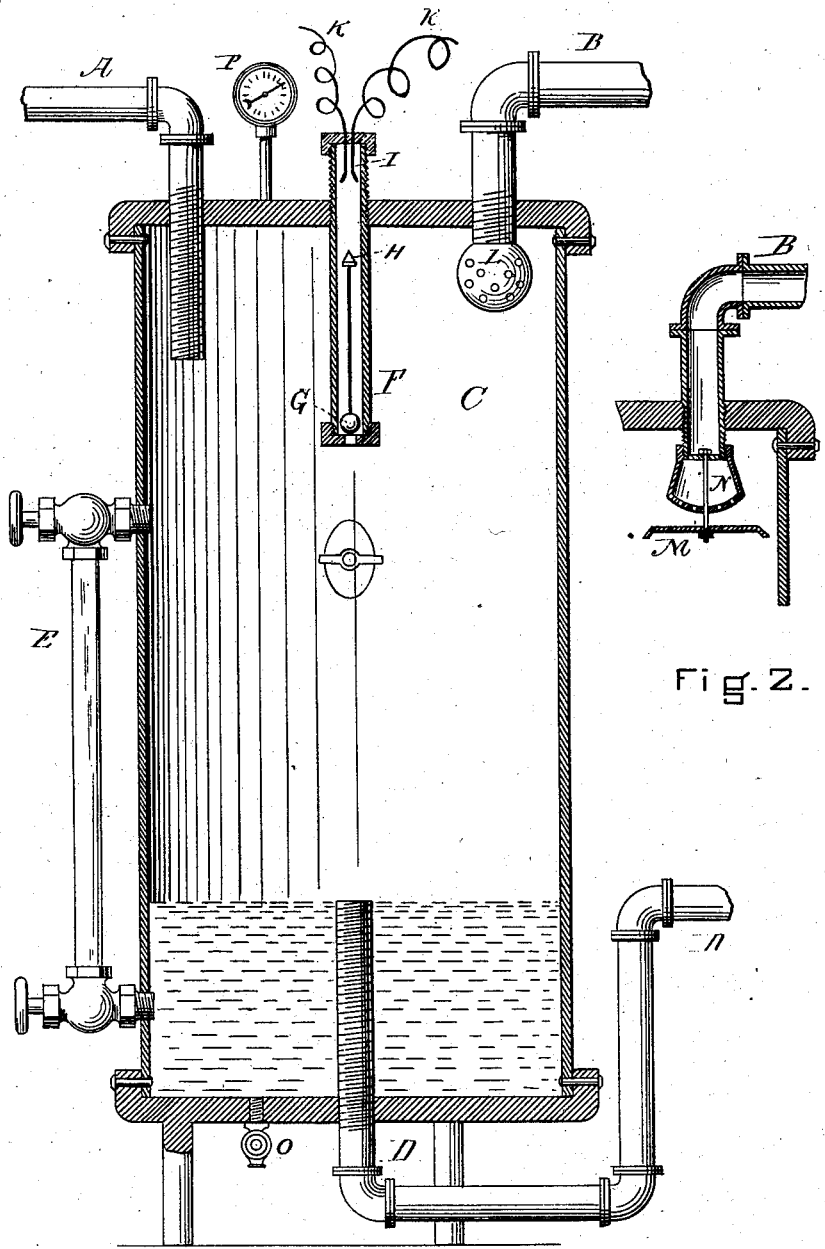

(No Model.)

E. H. ASHCROFT.
WATER AND STEAM SEPARATOR.

No. 258,872. Patented June 6, 1882.

WITNESSES
Frank G. Parker
A. O. Orne

INVENTOR
Edward H. Ashcroft

UNITED STATES PATENT OFFICE.

EDWARD H. ASHCROFT, OF LYNN, MASSACHUSETTS.

WATER AND STEAM SEPARATOR.

SPECIFICATION forming part of Letters Patent No. 258,872, dated June 6, 1882.

Application filed April 19, 1882. (No model.)

*To all whom it may concern:*

Be it known that I, EDWARD H. ASHCROFT, of Lynn, in the county of Essex and Commonwealth of Massachusetts, a citizen of the United States, have invented a certain new and useful Improvement in Water and Steam Separators, of which the following is a full, clear, and exact description, reference being had to the accompanying drawings, forming a part of this specification.

This invention relates to that class of improvements known as "water and steam separators," and which are generally attached to the steam-space of steam-generators and steam-supply pipes. In this case, however, I propose a new field for its employment—i. e., that of interposing the separator between the steam-main of what is known as the "system of steam-distribution" and an operating steam-engine which receives its steam-supply from such steam-distributing system.

It is well known to steam-engine engineers that priming and foaming is a great annoyance, and sometimes dangerous to the engine, particularly when the engine becomes choked or obstructed with water. The unyielding and incompressible nature of water forms what may be termed a "solid body" in the steam-cylinder of an engine, and when the piston, in reaching either end of the cylinder, encounters it a general break of the engine is the result. Now, when such accidents occur to engines located near to the generator, where little or no condensation of steam is made in the pipes leading from the generator to the engine, how much more liable are such accidents to happen to engines placed hundreds of feet distant from the generator. Steam in traveling through long lengths of pipe will condense more or less, according to the distance it travels and the velocity of its motion, and when it is overcharged with water there is great danger of injury to the engine when the piston encounters water in the cylinder of the engine. Besides, wet steam, or steam overcharged or mixed with water, has much less elastic and expansive force than dry steam, and such steam impairs the power of a steam-engine.

To obviate the objections and dangers above referred to, and to remedy the evils pointed out, as well as many others, is the object of my invention.

Referring to the accompanying drawings and the letters of reference marked thereon, Figure 1 of the drawings represents a vertical section of my invention, and Fig. 2 a detail of the same.

A is the main inlet-steam supply pipe.

B is the outlet steam-supply pipe leading to the engine.

C is a steam and water separator, to which the pipes A and B are connected.

D is a waste-water outlet-pipe, one end of which extends up into the vessel or separator C, and the other end connects with a trap, through which the waste water is discharged free of the separator C, except a small quantity in the bottom of the separator to prevent waste of steam.

E is a glass water-indicator of the usual style.

F is a small chamber suspended from the top of the separator a distance of about twelve inches, having an opening in its lower end for the admission of water. In this chamber I locate a float, G, to which is connected a rod or stem provided on its upper end with a pointed metal guide, H, which, when the float is buoyed upward by the water, comes in contact with the metallic springs I and electric wires K K of an electric battery. The battery may be located in any convenient place where the alarm-bell of the battery will be heard by the engineer.

L is a perforated deflector or strainer attached to the pipe B to baffle spray or foam from entering the pipe B with steam, and M and N, Fig. 2, are also baffles for like purpose.

O is a cock to draw off the water from vessel C.

P is a steam-pressure indicator.

It is obvious that many modifications of this invention may be made within wide range, and I do not therefore desire to confine myself to the forms and particular devices shown.

The operation of my improved separator is as follows: The steam-supply from the system enters the separator C through the pipe A, which may extend some distance into the separator, that the water entrained or mixed with the steam will be delivered or separated from the steam at a point below the steam-inlet pipe B. The steam received in the separator C will, when required, flow to the engine through pipe B. The water, when it rises in the separator C to the level of pipe D, will be discharged through said pipe to a trap connected to the other end of said pipe; but when the trap fails to discharge the water from the separator, or when from any cause it rises in the separator to the height of the float G, the float will be buoyed upward, and thus the guide H will be brought in contact with the springs I and wires K K of the electric battery, which will form a circuit, and which will ring the alarm-bell of the battery, and the attendant or engineer will be notified of surplus water and danger to the engine.

What I claim therefore is—

1. A separator for steam-supply pipes, consisting of the separator or vessel C, inlet and outlet steam-pipes A and B, and means for signaling or alarming the attendant or engineer of a steam-engine, by means of an electric battery, of a surplus of water, as set forth.

2. The combination, in a steam and water separator, of a water-trap, the inlet and outlet steam-pipes A and B, the water-escape pipe D, the float-chamber F, and float G, and guide H, being arranged to operate a signaling device, substantially as shown and described.

3. A steam and water separator and alarm consisting of the vessel C, steam-pipes A and B, float-chamber F, float G, guide H, metallic springs I, waste-pipe D, and signaling mechanism, all arranged in the manner set forth and described.

In testimony that I claim the foregoing as my own I hereto affix my signature in presence of two witnesses.

EDWARD H. ASHCROFT.

Witnesses:
M. LUSCOMB,
GEO. H. CARLETON.